United States Patent

Kitagawa et al.

[11] Patent Number: 5,163,403
[45] Date of Patent: Nov. 17, 1992

[54] IGNITION TIMING CONTROL SYSTEM FOR INTERNAL COMBUSTION ENGINES

[75] Inventors: Hiroshi Kitagawa; Kojiro Tsutsumi; Ryuji Satoh; Sachito Fujimoto, all of Wako, Japan

[73] Assignee: Honda Giken Kogyo Kabushiki Kaisha, Tokyo, Japan

[21] Appl. No.: 812,993

[22] Filed: Dec. 24, 1991

[30] Foreign Application Priority Data

Dec. 28, 1990 [JP] Japan ................................ 2-417319

[51] Int. Cl.⁵ ............................................... F02P 5/00
[52] U.S. Cl. ................................................... 123/417
[58] Field of Search ............... 123/417, 321, 348, 329, 123/423, 414; 364/431.08

[56] References Cited

U.S. PATENT DOCUMENTS

| | | | |
|---|---|---|---|
| 4,437,442 | 3/1984 | Yamaguchi | 123/417 |
| 5,000,150 | 3/1991 | Miyaura et al. | 123/417 |
| 5,003,950 | 4/1991 | Kato et al. | 123/417 |
| 5,014,669 | 5/1991 | Takasaki et al. | 123/414 |

FOREIGN PATENT DOCUMENTS 62-17666 4/1987 Japan.
2-102347 4/1990 Japan.

Primary Examiner—Raymond A. Nelli
Attorney, Agent, or Firm—Armstrong & Kubovcik

[57] ABSTRACT

An ignition timing control system for an internal combustion engine in which an ECU sets a basic spark advance value in response to operating condition of the engine, corrects the set basic spark advance value, and delimits the corrected spark advance value in a spark retarding direction by means of a retard limiting value. The ECU further detects operating conditons of a valve timing changing system which changes the valve timing of at least one of an intake valve and an exhaust valve of the engine, and is responsive to the detected operating conditions of the valve timing changing system for changing the retard limiting value, e.g. in such a manner that when low-speed valve timing is selected, the retard limiting value is changed toward an advanced side relative to a value thereof set when high-speed valve timing is selected.

4 Claims, 5 Drawing Sheets

IGNITION TIMING CONTROL SYSTEM FOR INTERNAL COMBUSTION ENGINES

BACKGROUND OF THE INVENTION

1. Field of the Invention

This invention relates to an ignition timing control system for internal combustion engines, and more particularly to an ignition timing control system for an internal combustion engine having a system for changing the valve timing of intake valves and/or exhaust valves thereof.

2. Prior Art

Amongst conventional methods for electronically controlling the ignition timing of an internal combustion engine, there is widely known a method of controlling the ignition timing by the use of a spark ignition advance value set in dependence on operating conditions of the engine.

Conventional ignition timing control systems employing this method include an ignition timing control system which delimits a retard-side limit of a spark advance value corrected toward a retarded side in accordance with engine operating parameters etc., by means of a retard limiting value set in dependence on engine rotational speed to thereby prevent a misfire or a flashover due to sudden acceleration or sudden deceleration of the engine, as disclosed e.g. in Japanese Provisional Patent Publication (Kokai) No. 62-17666.

Recently, internal combustion engines have been proposed, which have a valve timing changing system for changing the valve opening period and/or lift (hereinafter generically called "valve timing") of intake valves and/or exhaust valves of the engine in dependence on the engine rotational speed, e.g. by Japanese Provisional Patent Publication (Kokai) No. 2-102347.

Such a valve timing changing system is adapted to select at least high-speed valve timing suitable for engine operation in a high engine rotational speed region, and low-speed valve timing suitable for engine operation in a low-engine rotational speed region so as to enhance the trapping efficiency (combustion efficiency) of the engine and hence increase the engine output. Further, the value timing changing system is also capable of controlling the valve timing in response to operating parameters of the engine such as engine rotational speed and engine load, to thereby enable to always optimize the combustion efficiency.

In an internal combustion engine equipped with a valve timing changing system, the charging efficiency $\eta$ of a mixture drawn into the engine cylinders differs between when high-speed valve timing is selected and when low-speed valve timing is selected, even if other engine operating parameters such as intake air temperature remain unchanged. More specifically, as shown in FIG. 5, if low-speed valve timing (LoV/T) is selected when the engine rotational speed NE is higher than a predetermined rotational speed NE1, the charging efficiency $\eta$ is lower than if high-speed valve timing (HiV/T) is selected, so that the mixture is drawn into the engine cylinders in smaller quantities. If a smaller amount of fuel, which is conductive, contained in the mixture is thus present within the engine cylinder, the voltage required to be applied to the spark plug to cause sparking thereof (hereinafter called "spark voltage") becomes higher, which can result in a misfire or a flashover. To avoid this, it is necessary to change the retard-side limit of ignition timing in response to changeover of the valve timing.

Therefore, if a retard limiting value defining the retard-side limit of ignition timing as disclosed in Japanese Patent Publication No. 62-17666, hereinabove referred to, which value is set to a constant value suitable for an internal combustion engine having uncontrolled valve timing. is applied to control the ignition timing of an internal combustion engine having controlled valve timing, there is a problem of occurrence of a misfire or a flashover due to elevated spark voltage of the spark plug encountered when low-speed valve timing is selected when the engine rotational speed is in a high rotational speed region for selecting high-speed valve timing.

SUMMARY OF THE INVENTION

It is the object of the invention to provide an ignition timing control system for an internal combustion engine, which is capable of improving the ignitability of the engine to thereby avoid a misfire and a flashover, even if the engine is equipped with a valve timing changing system.

To attain the above object, the present invention provides an ignition timing control system for an internal combustion engine having at least one pair of intake valve and exhaust valve, and valve timing changing means for changing valve timing of at least one of the intake valve and the exhaust valve, the system including engine operating condition detecting means for detecting operating conditions of the engine, setting means responsive to operating conditions of the engine detected by the engine operating condition detecting means for setting a basic spark advance value, correcting means for correcting the basic spark advance value set by the setting means, and retard limiting means for setting a retard limiting value and delimiting the spark advance value corrected by the correction means, in a spark retarding direction by means of the retard limiting value.

The ignition timing control system according to the invention is characterized by an improvement comprising:

valve timing detecting means for detecting operating conditions of the valve timing changing means; and limiting value changing means responsive to operating conditions of the valve timing changing means detected by the valve timing detecting means for changing the retard limiting value set by the retard limiting means.

In a preferred embodiment, the valve timing changing means changes the valve timing at least between low-speed valve timing suitable for operation of the engine in a predetermined low rotational speed region of the engine and high-speed valve timing suitable for operation of the engine in a predetermined high rotational speed region of the engine, and wherein when the valve timing changing means changes the valve timing to the low-speed valve timing, the limiting value changing means changes the retard limiting value set by the retard limiting means, in a spark advancing direction relative to the retard limiting value set when the valve timing changing means changes the valve timing to the high-speed valve timing.

The above and other objects, features, and advantages of the invention will be more apparent from the following detailed description taken in conjunction with the accompanying drawings.

DETAILED DESCRIPTION

The invention will now be described in detail with reference to the drawings showing an embodiment thereof.

Figure 2:
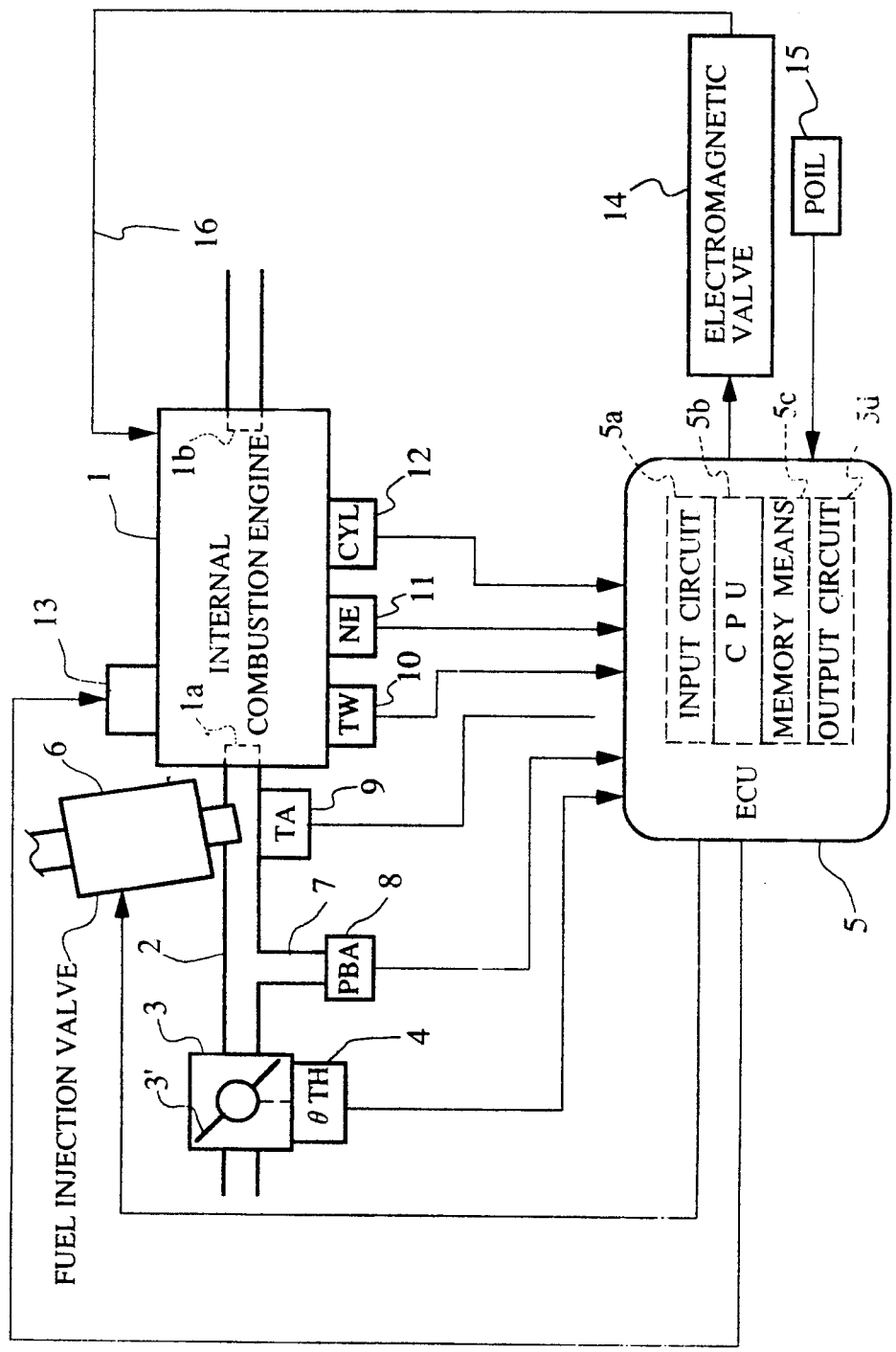
FIG. 2 is a block diagram showing the whole arrangement of an internal combustion engine incorporating an ignition timing control system according to the invention.

Referring first to FIG. 2, there is shown the whole arrangement of an ignition timing control system according to an embodiment of the invention.

In the figure, reference numeral 1 designates an internal combustion engine of the DOHC straight type having four cylinders, and a pair of intake valve and exhaust valve (only one pair is shown) provided at each cylinder. The engine is provided with a valve timing changeover mechanism 16 which performs two-stage selection of the valve timing of each of the intake valve 1a and the exhuast valve 16, i.e. between high-speed valve timing suitable for engine operation in a predetermined high engine rotational speed region and low-speed valve timing suitable for engine operation in a predetermined low engine rotational speed region.

In an intake pipe 2 of the engine 1, there is arranged a throttle body 3 accommodating a throttle valve 3' therein. A throttle valve opening ($\theta$TH) sensor 4 is connected to the throttle valve 3' for supplying an electric signal indicative of the sensed throttle valve opening to an electronic control unit ("hereinafter referred to as the ECU") 5.

Fuel injection valves 6 are each provided for each cylinder and arranged in the intake pipe 2 at a location between the engine 1 and the throttle valve 3', and slightly upstream of the intake valve 1a. The fuel injection valves 6 are connected to a fuel pump, not shown, and electrically connected to the ECU 5 to have their valve opening periods controlled by signals therefrom.

An intake pipe absolute pressure (PBA) sensor 8 is provided in communication with the interior of the intake pipe 2 via a conduit 7 at a location immediately downstream of the throttle valve 3' for supplying an electric signal indicative of the sensed absolute pressure to the ECU 5. An intake air temperature (TA) sensor 9 is mounted in the wall of the intake pipe 2 at a location downstream of the conduit 7 for supplying an electric signal indicative of the sensed intake air temperature TA to the ECU 5. An engine coolant temperature (TW) sensor 10 which is formed of a thermistor or the like is inserted into the wall of an engine cylinder filled with engine coolant in the cylinder block of the engine 1, for supplying the sensed coolant temperature TW to the ECU 5.

An engine rotational speed (NE) sensor 11 and a cylinder-discriminating (CYL) sensor 12 are arranged in facing relation to a camshaft or a crankshaft of the engine 1, neither of which is shown. The engine rotational speed sensor 11 generates a pulse as a TDC signal pulse at each of predetermined crank angles whenever the crankshaft rotates through 180 degrees, while the cylinder-discriminating sensor 12 generates a pulse at a predetermined crank angle of a particular cylinder of the engine, both of the pulses being supplied to the ECU 5.

A spark plug 13 of each cylinder of the engine 1 is electrically connected to the ECU 5 to have its ignition timing $\theta$ig controlled by a signal therefrom.

Connected to the output side of the ECU 5 is an electromagnetic valve 14 for controlling changeover of the valve timing, which is controlled to open and close by a control signal from the ECU 5. The electromagnetic valve 14 operates to change the pressure of operating oil within the valve timing changeover mechanism 16 between higher pressure and lower pressure whereby the valve timing is changed between high-speed valve timing and low-speed valve timing. The pressure of operating oil is sensed by an oil pressure (POIL) sensor 15 which supplies an electric signal indicative of the sensed oil pressure to the ECU 5.

The ECU 5 comprises an input circuit 5a having the functions of shaping the waveform of input signals from the above-mentioned sensors, shifting the voltage levels of sensor output signals to a predetermined level, converting analog signals from analog-output sensors to digital signals, and so forth, a central processing unit (hereinafter referred to as "the CPU") 5b, memory means 5c including a ROM storing various operational programs which are executed in the CPU 5b, and a RAM for storing results of calculations therefrom, etc., and an output circuit 5b which outputs driving signals to the fuel injection valves 6, the spark plugs 13, and the electromagnetic valve 14.

In the ECU 5 constructed as above, the fuel injection period (valve opening period) Tout is calculated in response to operating conditions of the engine 1, and the ignition timing control is effected in response to operating conditions of the engine 1.

More specifically, the CPU 5b is responsive to operating conditions of the engine 1 to calculate the fuel injection period (valve opening period) Tout by the use of the following equation (1), in synchronism with generation of TDC signal pulses:

$$\text{Tout} = Ti \times K_1 + K_2 \ldots \qquad (1)$$

where Ti represents a basic fuel injection period corresponding to a basic fuel quantity which is determined as a function of engine rotational speed NE and absolute pressure PBA within the intake pipe 2, for instance. The memory means 5c stores a Ti value map which comprises two maps, i.e. one for use at low-speed valve timing (TIL map), and the other for use at high-speed valve timing (TiH map).

$K_1$ and $K_2$ are other correction coefficients and variables, respectively, which are determined to respective appropriate valves optimizing characteristics of the engine such as fuel consumption and accelerability.

Further, the CPU 5b calculates a spark advance value (ignition timing value) $\theta$IG by the use of the following equation (2);

$$\theta IG = \theta IGMAP - \Delta\theta IG \tag{2}$$

where $\theta IGMAP$ represents a basic spark advance value which is determined in accordance with operating conditions of the engine 1, e.g. as a function of engine rotational speed NE and absolute pressure PBA within the intake pipe 2 representative of load on the engine 1. In the present embodiment, the basic spark advance value $\theta IGMAP$ is read from an ignition timing map stored in the memory means 5c, in accordance with engine rotational speed NE and intake pipe absolute pressure PBA. The ignition timing map comprises two maps, i.e. a $\theta IGMAPL$ map for use at low-speed valve timing and a $\theta IGMAPH$ map for use at high-speed valve timing.

In the above equation (1), $\Delta\theta IG$ represents a correction value which is read from a correction value map stored in the memory means 5c in accordance with engine coolant temperature TW, intake air temperature TW, another engine operating parameter indicative of whether or not the engine is in a full load condition (WOT), etc.

In the ignition timing control system according to this embodiment, a retard limiting value $\theta IGGi$ (i=H or L), which is a limit value in the spark retarding direction, is provided for the spark advance value $\theta IG$ calculated by the equation (2) to delimit the maximum value of the ignition timing in the spark retarding direction. The retard limiting value $\theta IGGi$ is changed according to valve timing selected.

Figure 3:
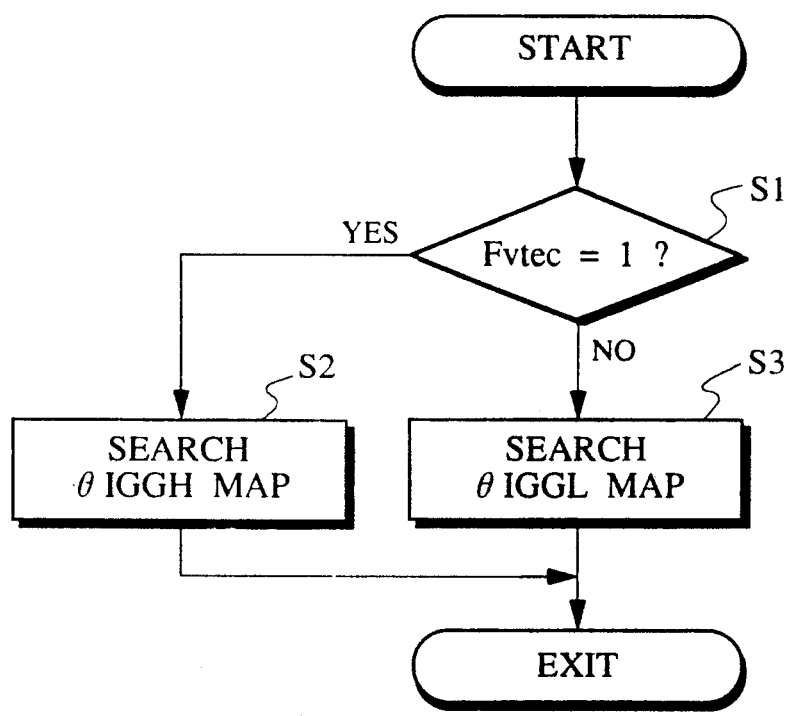
FIG. 3 is a flowchart showing a manner of selecting retard correction value (retard limiting value) maps in response to selected valve timing.

FIG. 3 shows a manner of selecting maps of retard limiting value $\theta IGGi$, which are selectively retrieved depending upon valve timing selected.

First, it is determined at a step S1 whether or not a flag Fvtec has been set to "1". That is, whether the valve timing of the intake and exhaust valves 1a, 1b have been set to high-speed valve timing or to low-speed valve timing is determined from the state of the flag Fvtec, i.e. "1" or "0". If the flag Fvtec has been set to "1", it is judged that the intake and exhaust valves have been set to high-speed valve timing. Then, the retard limiting value $\theta IGGH$ map for high-speed valve timing is selected and searched to read a retard limiting value $\theta IGGH$ at a step S2. On the other hand, if the flag Fvtec assumes "0", it is judged that the valve timing has been set to low-speed valve timing. Then, the retard limiting value $\theta IGGL$ map for low-speed valve timing is selected and searched to read a retard limiting value $\theta IGGL$ at a step S3.

Figure 4:
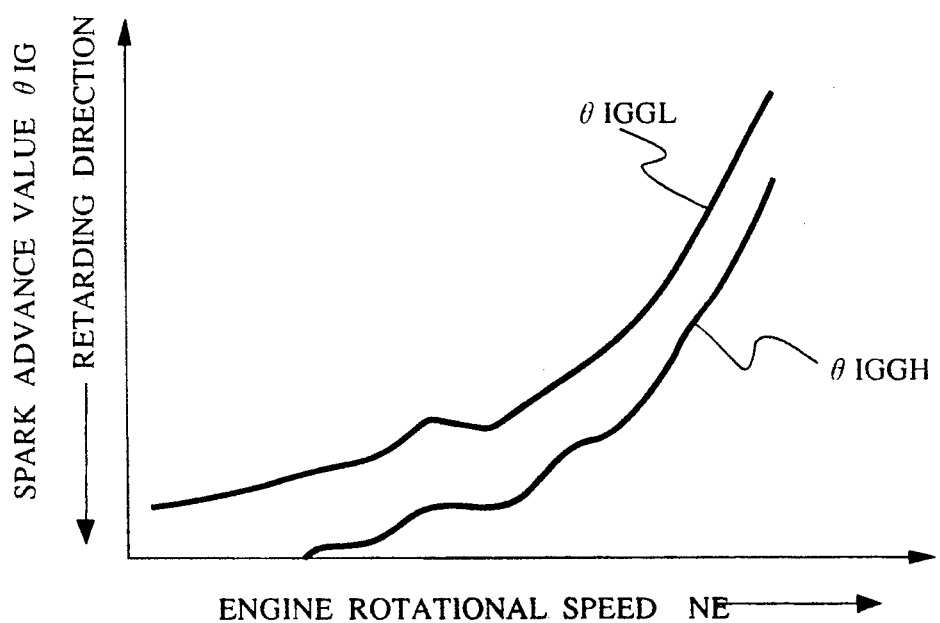
FIG. 4 is a graph showing curved lines representing retard correction values selected according to the manner of FIG. 3.

FIG. 4 shows a retard limiting value $\theta IGGL$ curve set in the $\theta IGGL$ map and a retard limiting value $\theta IGGH$ curve set in the $\theta IGGH$ map. In the graph of FIG. 4, the abscissa represents engine rotational speed NE, and the ordinate the final spark advance value $\theta IG$.

Figure 1:
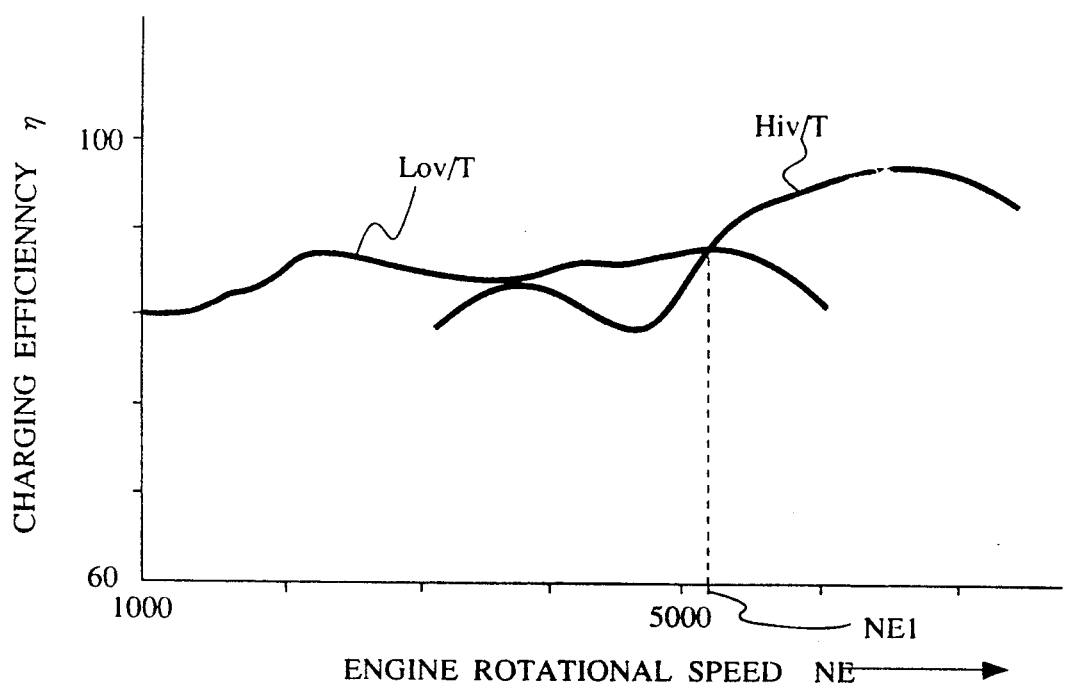
FIG. 1 is a graph showing the relationship between valve timing, engine rotational speed, and charging efficiency $\eta$ in an internal combustion engine having a valve timing changing system.

According to the present embodiment, when the high-speed valve timing is selected, at which a relatively large amount of mixture is drawn into the engine cylinder, the final spark advance value $\theta IG$ is limited in the spark retarding direction by the retard limiting value $\theta IGGH$, whereas when the low-speed valve timing is selected, at which a relatively small amount of mixture is drawn into the engine cylinder, the value $\theta IG$ is limited in the spark retarding direction by the retard limiting value $\theta IGGL$ which is set on an advanced side relative to the retard limiting value $\theta IGGH$, so that the ignition timing is controlled by the spark ignition changing value $\theta IGGL$. As a result, if the valve timing is set to the low-speed valve timing while the engine rotational speed NE lies in the high-speed valve timing selecting speed region in FIG. 1, positive sparking can be assured even in such a state where the charging efficiency of the mixture is low and hence the conductivity within the engine cylinder is degraded, thus enabling to prevent a misfire or a flashover. In the present embodiment, the retard limiting value $\theta IGGL$ is set in the vicinity of values of the basic spark advance value $\theta IG$ in the $\theta IG$ map which are assumed when the engine is in a full load operating condition (WOT).

Figure 5:
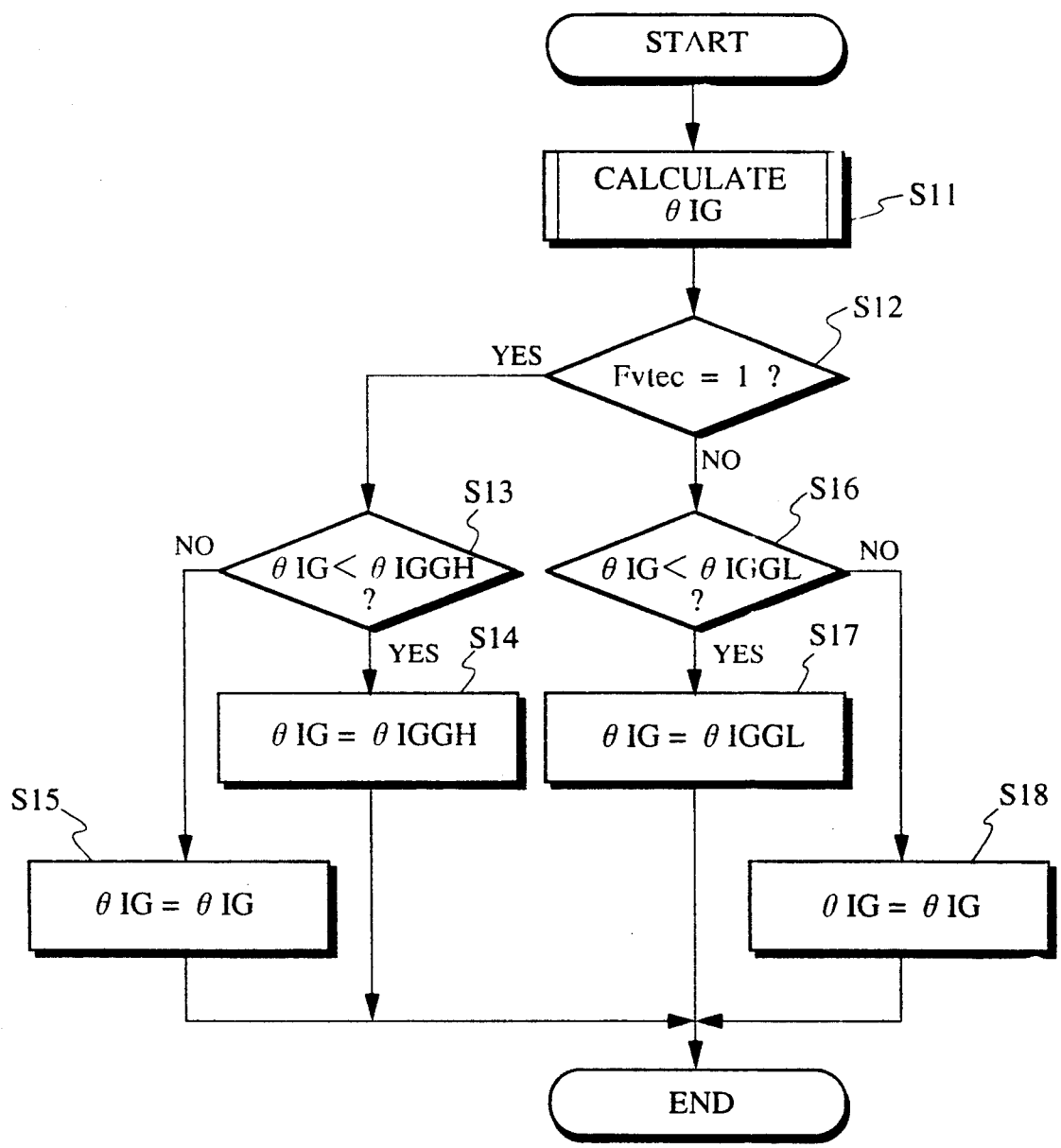
FIG. 5 is a flowchart showing a manner of setting a final spark advance value (ignition timing value).

FIG. 5 shows a manner of effecting the retard limitation against the spark advance value $\theta IG$ by the use of the retard limiting value $\theta IGGi$ selected according to valve timing selected. This program is executed upon generation of each TDC signal pulse and in synchronism therewith.

First, at a step S11 in FIG. 5, the spark advance value $\theta IG$ is calculated by first reading the basic spark advance value $\theta IGMAPi$ from the $\theta TGMAPH$ map or the $\theta IGMAPL$ selected according to value timing selected, and then correcting the read $\theta IGMAPi$ value by the correction value $\Delta\theta IG$ by the equation (2), and the calculated $\theta IG$ value is stored into the memory means 5c.

Then, it is determined at a step S12 whether or not the flag Fvtec assumes "1". If the flag Fvtec assumes "1", it is judged that the intake and exhaust valves are now set to high-speed valve timing. Then, it is determined at a step S13 whether or not the spark advance value $\theta IG$ calculated above exceeds the retard limiting value $\theta IGGH$ for high-speed valve timing, i.e. whether or not the former has a value on the retarded side relative to the latter ($\theta IG < \theta IGGH$). If $\theta IG < \theta IGGH$, it is judged that if the ignition timing is set by the spark advance value $\theta IG$, there can occur a misfire etc., and accordingly the final spark advance value $\theta IG$ is set to the retard limiting value $\theta IGGH$ at a step S14, followed by effecting spark ignition based upon the set final spark advance value $\theta IG$, i.e. the retard limiting value $\theta IGGH$.

If $\theta IG \geq \theta IGGH$, the final spark advance value $\theta IG$ is set to the spark advance value $\theta IG$ calculated by the use of the equation (2), at a step S15, followed by effecting spark ignition based upon the set final spark advance value $\theta IG$.

On the other hand, if the flag Fvtec is determined to assume "0", at the step S12, it is judged that low-speed valve timing is selected. Then, it is determined at a step S16 whether or not the spark advance value $\theta IG$ calculated at the step S11 exceeds the retard limiting value $\theta IGGL$ set on the advanced side relative to the retard limiting value $\theta IGGH$, i.e. whether or not the former has a value on the retarded side relative to the latter ($\theta IG < \theta IGGL$). If $\theta IG < \theta IGGL$, the final spark advance value $\theta IG$ is set to the retard limiting value $\theta IGGL$ at a step S17, followed by terminating the program.

On the other hand, if $\theta IG \geq \theta IGGL$, the final spark advance value $\theta IG$ is set to the spark advance value $\theta IG$ calculated at the step S11, at a step S18, followed by terminating the program.

The embodiment described above is not limitative. For example, three kinds or more of valve timing may be provided, e.g. high-speed valve timing, medium-speed valve timing, and low-speed valve timing, instead of two kinds, i.e. high-speed valve timing and low-speed valve timing as employed in the foregoing embodiment. Accordingly, three or more retard limiting values may be provided for respective kinds of valve timing, such that the retard limiting value for low-speed valve timing is set to advanced values relative to retard limiting values for high-speed valve timing and medium-speed valve timing.

As described above, the ignition timing control system according to the invention comprises valve timing detecting means for detecting operation conditions of valve timing changing means which changes the valve timing of at least one of an intake valve and an exhaust valve of each cylinder, and limiting value changing means for changing a retard limiting value set by retard limiting means, in response to operating conditions of the valve timing changing means detected by the valve timing detecting means.

Therefore, the retard limiting value can be changed in accordance with valve timing selected in such a manner that when the at least one of the intake valve and the exhaust valve is set to low-speed valve timing, the retard limiting value is changed toward an advanced side, to thereby assure positive spark ignition and avoid a misfire or a flashover even if the conductivity within engine cylinders changes due to a change in the charging efficiency of the mixture caused by changeover of the valve timing.

What is claimed is:

1. In an ignition timing control system for an internal combustion engine having at least one pair of intake valve and exhaust valve, and valve timing changing means for changing valve timing of at least one of said intake valve and said exhaust valve, said system including engine operating condition detecting means for detecting operating conditions of said engine, setting means responsive to operating conditions of said engine detected by said engine operating condition detecting means for setting a basic spark advance value, correcting means for correcting said basic spark advance value set by said setting means, and retard limiting means for setting a retard limiting value and delimiting said spark advance value corrected by said correction means, in a spark retarding direction by means of said retard limiting value, the improvement comprising:

valve timing detecting means for detecting operating conditions of said valve timing changing means; and limiting value changing means responsive to operating conditions of said valve timing changing means detected by said valve timing detecting means for changing said retard limiting value set by said retard limiting means.

2. An ignition timing control system as claimed in claim 1, wherein said valve timing changing means changes said valve timing at least between low-speed valve timing suitable for operation of said engine in a predetermined low rotational speed region of said engine and high-speed valve timing suitable for operation of said engine in a predetermined high rotational speed region of said engine, and wherein when said valve timing changing means changes said valve timing to said low-speed valve timing, said limiting value changing means changes said retard limiting value set by said retard limiting means, to an advanced side relative to said retard limiting value set when said valve timing changing means changes said valve timing to said high-speed valve timing.

3. An ignition timing control system as claimed in claim 2, wherein when said valve timing changing means changes said valve timing to said low-speed valve timing, said limiting value changing means changes said retard limiting value set by said retard limiting means to a value in the vicinity of said basic spark advance value set when said engine is in a full load operating condition.

4. An ignition timing control system as claimed in any of claim 1 to 3, wherein said retard limiting means sets said retard limiting value in dependence on rotational speed of said engine.

* * * * *